June 30, 1970  H. A. BELLER  3,517,777
SPOT-TYPE DISK BRAKE
Filed Aug. 20, 1968  3 Sheets-Sheet 1

INVENTOR.
HANS A. BELLER
BY
Karl F. Ross
ATTORNEY

June 30, 1970

United States Patent Office 3,517,777
Patented June 30, 1970

3,517,777
SPOT-TYPE DISK BRAKE
Hans Albert Beller, Bad Vilbel, Germany, assignor to Alfred Teves G.m.b.H., Frankfurt am Main, Germany, a corporation of Germany
Filed Aug. 20, 1968, Ser. No. 754,086
Claims priority, application Germany, Sept. 15, 1967, T 34,790
Int. Cl. F16d 55/224
U.S. Cl. 188—73.1         10 Claims

ABSTRACT OF THE DISCLOSURE

A spot-like disk brake has a pivotal two-part housing or caliper with a radial opening for removing and replacing the brakeshoes. These brakeshoes are held laterally between guide flanks to keep them from twisting and are pushed inward by narrow strips parallel to the pivot axis to permit limited rocking of them. Bent back tab corners on the backing plates of the brakeshoes also hold them parallel to the brake disk.

---

My invention relates to a spot-type disk brake, and, more particularly, to a pivotal floating-yoke disk brake.

Such brakes are known wherein the yoke pivots about an axis orthogonal to the rotation axis of the brake disk in order to draw one brakeshoe into contact with a face of the disk, when the other is pushed thereagainst by a piston. However, such brakes present several problems.

One of the major problems lies in servicing these brakes, since the brakeshoes are generally mounted on pins or bolts which must take up all the stresses inherent in braking. Naturally, this tends to deform these pins or bolts making it very difficult to remove them and sometimes even causing them to shear. Furthermore, the twisting or torsional stress applied to them often makes it difficult for the one brakeshoe pushed by the piston to slide into contact with the disk due to friction.

In addition, in order to make the yoke or housing as strong as possible, it is usually made in one piece. This latter disadvantage makes it very difficult to change brakeshoes, often requiring almost complete disassembly of the brake. The method makes it necessary to bore out the cylinder from the outside, thereby leaving a sizeable hole through the housing which must later be closed and always presents a leak hazard.

It is therefore the object of my invention to provide a brake which overcomes these above-mentioned difficulties. This object is obtained by providing a disk brake wherein the brakeshoes are held between guide flanks and holding ribs. In this manner the torque on the brakeshoes is uniformly absorbed by the whole housing thereby alleviating the strain from the pins or bolts. Another feature of my invention is the provision of bent back tab corners on the backing plate which cooperate with the guide flanks. These tabs also tend to keep the brakeshoes parallel to the disk by effectively making the brakeshoe thicker while also allowing a more complete wearing of that brakeshoe.

Furthermore, my invention includes making the yoke or caliper in two sections with a brakeshoe-removal opening between them. As a result of this construction, the piston bore need not be machined from outside thus making for a relatively inexpensive fabrication. Also, the brakeshoes can be replaced through the opening with a minimum of difficulty. According to a particular further feature of my invention, the joint between the two yoke sections or lobes is not directly over the disk but is offset toward the wheel disk and the unsupported lobe. Thus, even with highly worn brakeshoes, the actuated brakeshoe is fully guided at all times.

My invention further provides that between the backing plates and their respective pushing surfaces the only contact area is a thin strip or ridge parallel to the yoke pivot axis. Thus, as the brakes are applied, the brakeshoes can rock to a limited extent thereby wearing more evenly than was previously possible with such disk brakes.

The above and other objects, features, and advantages will be more readily apparent from the following description, reference being made to the accompanying drawing, in which.

Figure 1:
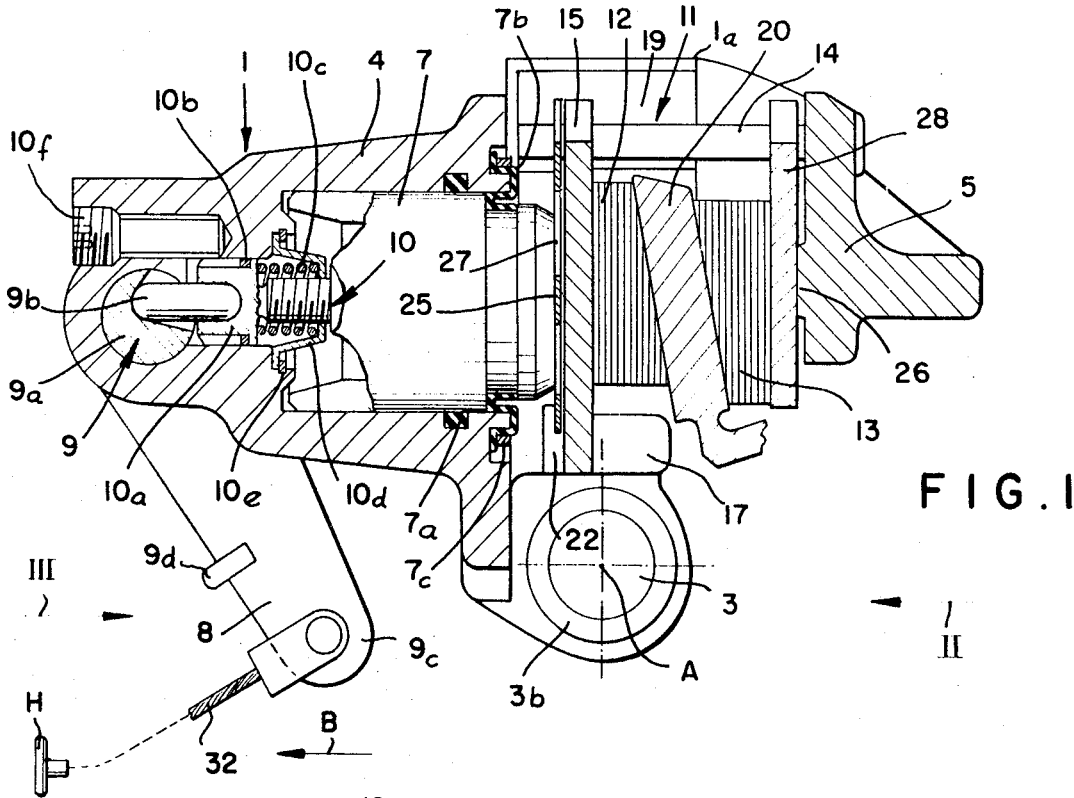
FIG. 1 is a longitudinal section through a disk brake according to my invention.

A brake-housing yoke 1 has two sections 4 and 5 roughly corresponding to the two lobes of the brake and held together by bolts 6. The section 4 is pivotal about an axis A by means of two balls 2 and 3 mounted in seat members 2a and 3a and held by washers 2b and 3b respectively in a support 31 on the vehicle body (see the commonly assigned copending application Ser. No. 743,454, filed July 9, 1968 by me jointly with Hans Erdmann and Friedrich Beuchle).

Two brake linings 12 and 13, mounted on backing plates 15 and 28 respectively in an opening 11 between the sections 4 and 5, are engageable with opposite faces of a brake disk 20 rotatable about an axis orthogonal to the axis A. The backing plates 15 and 28 are held in by removable pins or guide elements 14 passing slidably through their lugs in the usual manner.

Figure 3:
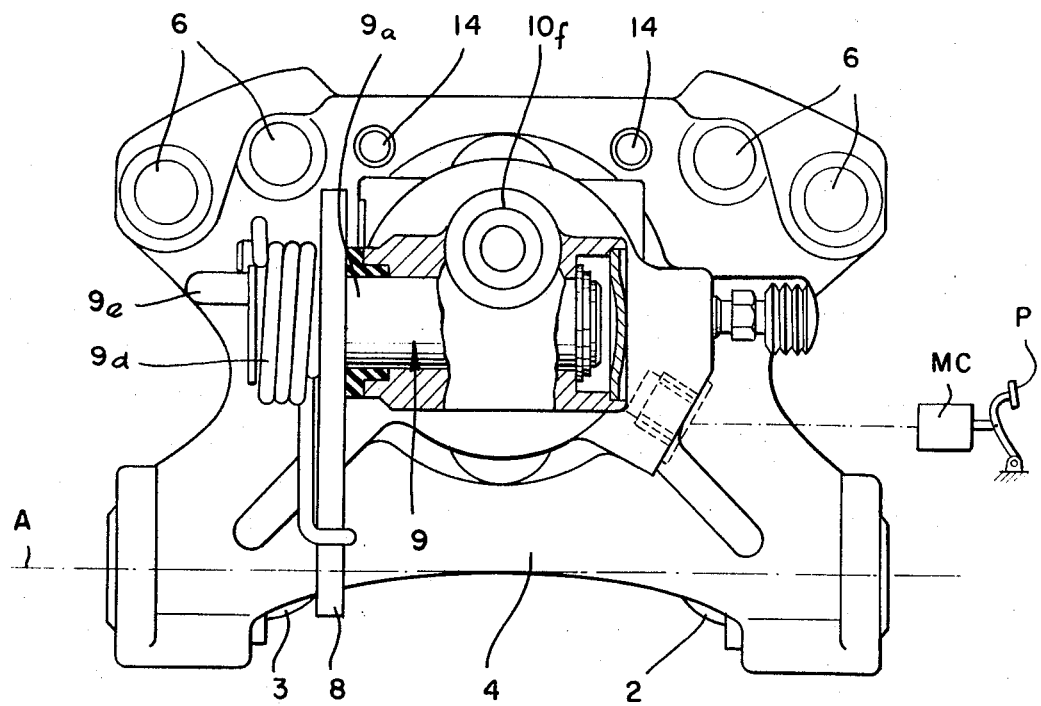
FIG. 3 is another end view, partly broken away, of the same disk brake in the direction of arrow III of FIG. 1.

A piston 7 sealed by a ring 7a and a cuff 7b held by a ring 7c can move axially under the force of brake fluid from a master cylinder MC actuated by a pedal P (FIG. 3). This forces the lining 12 against one face of the disk 20 thereby drawing the other lining 13 into engagement with the other face of the disk 20.

The brake is also equipped with a self-adjustment mechanism 10 wherein an axially splined or vaned member 10a sealed by a ring 10b is threaded into the nonrotatable piston 7 such that, on axial movement of the piston 7 toward the disk 20, it is pulled against the force of the spring 10c held by a cap 10d retained in turn by a snap ring 10e until the vanes on the member 10a are out of engagement with the vanes on an adjustment member 10f. This indexes the member 10a slightly, screwing it against the piston 7 so that the overall length of the mechanism is slightly longer and, therefore, the brake is adjusted.

Behind the member 10a is a pin 9b engaged in a cutout cam shaft 9a connected to a lever 9c of a hand brake 9. This lever 9c is held in open position by a spring 9d hooked around it and a pin 9e. A pull on the handle H attached to the lever 9c via a cable 32 in the direction of an arrow B pushes the piston 7 forward via the shaft 9a, the pin 9b, and the member 10a, thereby applying the brake.

Figure 2:
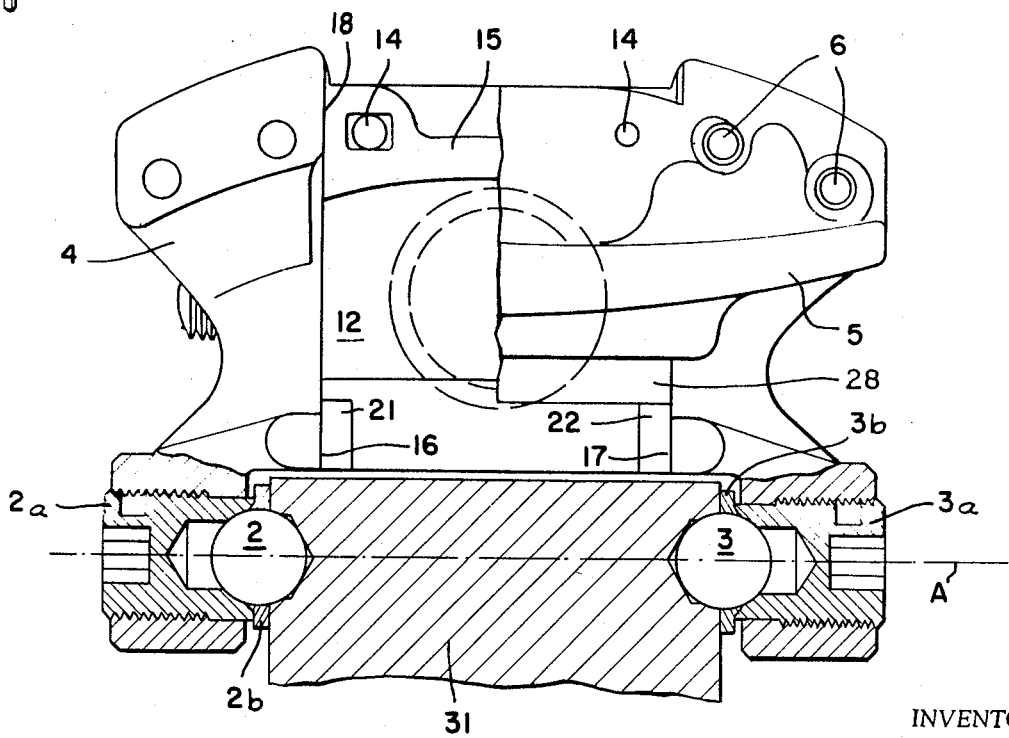
FIG. 2 is an end view, partly broken away, of the same disk brake in the direction of arrow II of FIG. 1.
Figure 4:
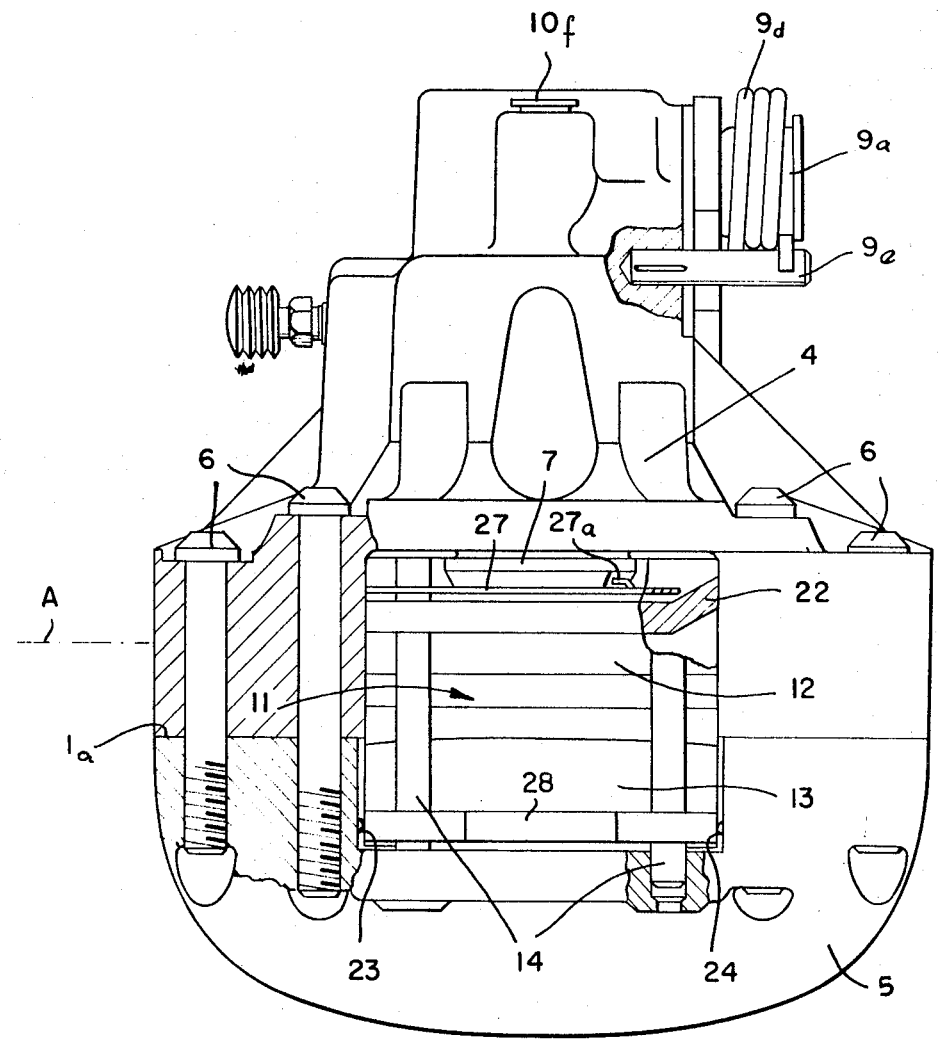
FIG. 4 is a top view, partly broken away, of the disk brake according to my invention.

As can be best seen from FIGS. 1 and 2, guide flanks 16 and 17 near the pivot axis A guide the backing plate 15 on the bottom. The guide flanks extend in the direction of the disk axis and are spaced apart in the direction of the pivot axis. The backing plate 28 is guided in the section 5 by holding ribs 23 and 24 best seen in FIG. 4. In this manner the backing plate 15 and 28 are prevented from twisting against the pins 14. Thus the torsion of braking is evenly absorbed by the yoke 1 and transmitted to the member 31 without undue stress being applied across the pins 14.

The lower bottom corners of the backing plate 15 are bent back to form tabs 21 and 22. These tabs 21 and 22, cooperating with the guide flanks 16 and 17, prevent canting of the brakeshoe 12 about a radial axis in relation to the disk 20.

FIG. 1 shows a thin plate 27 hung on the pins 14 between the backing plate 15 and the piston 7. The center region of this plate 27 is cut out so that it only contacts the piston 7 with a thin strip 25. The plate 27 is furthermore provided with a small finger 27a which engages in a corresponding cutout in the piston 7. This prevents the piston 7 from turning for optimum self-adjustment action. The section 5 is similarly formed with a ridge 26 contacting the backing plate 28. In this manner the plates 28 and 15 can rock to a limited extent as the brakes are applied. Due to the pivotal movement of the housing 1 and the frusto-conical shape of the disk faces this is advantageous. Furthermore, new brakeshoes will be more quickly and evenly worn in.

I claim:
1. A disk brake comprising:
a brake disk rotatable about a disk axis and having a pair of opposite annular brake faces;
a nonrotatable yoke mounted along the periphery of said disk and having a pair of lobes disposed along said opposite faces;
pivot means on said yoke defining therefor a pivot axis generally orthogonal to said disk axis, one of said lobes being formed with a first pair of confronting flat and parallel guide flanks spaced apart in the direction of said pivot axis and extending generally in the direction of said disk axis proximal to said pivot means and a second pair of flat and parallel guide flanks spaced apart in the direction of said pivot axis and extending parallel to said first pair of guide flanks distal from said pivot means;
a respective breakeshoe juxtaposed with and engageable with each of said faces and received in respective lobes of said yoke, the brakeshoe corresponding to said one of said lobes being slidably guided between said guide flanks, each of said brakeshoes having a flat relatively thin backing plate turned away from said disk and carrying a relatively thick brake lining engageable therewith, the plate in said one of said lobes being substantially rectangular and having a pair of opposite parallel edges each engageable with one of said first and one of said second guide flanks, said backing plate having turned away portions between said lining and pivot axis engageable with said guide flanks;
actuating means in said one of said lobes for urging the brakeshoe in said one of said lobes against said one of said faces, said yoke being pivotal about said pivot axis to draw the other of said brakeshoes against the other of said faces; and
a pair of substantially parallel elongated engaging formations extending substantially parallel to said pivot axis, one of said formations being between and engaging one of the backing plates and said actuating means and the other of said formations being between and engaging the other of said lobes and the other of said backing plates, said brakeshoes being thereby rockable on said formations about substantially parallel axes substantially parallel to said pivot axis with said sides continuously engaging said flanks.

2. The brake defined in claim 1 wherein said housing is formed with an opening radial of said disk axis and of said brakeshoes, said brake further comprising at least one removable guide element extending across said opening between said flanks and passing with play through said backing plate, said brakeshoes being removable through said opening on removal of said element.

3. A disk brake comprising:
a brake disk rotatable about a disk axis and having a pair of opposite annular brake faces;
a nonrotatable yoke mounted along the periphery of said disk pivotal about a pivot axis generally orthogonal to said disk axis and having a pair of lobes disposed along said opposite faces, one of said lobes being formed with a pair of confronting flat guide flanks spaced apart in the direction of said pivot axis and extending generally in the direction of said axis proximal to said pivot axis, said yoke having a generally radial opening between said flanks;
a respective brakeshoe juxtaposed with and engageable with each of said faces and received in respective lobes of said yoke, the brakeshoe in said one of said lobes being slidably guided between said flanks and withdrawable radially through said opening while having a relative thick brake-lining pad engageable with one of said faces and a relatively thin substantially rectangular backing plate turned away from said one face and having a pair of corners toward said pivot axis bent back from said one face to form a pair of mutually divergent tabs engaging said flanks, said tabs being between said pad and said pivot axis, said one of said lobes being formed with a fluid cylinder substantially parallel to said disk axis; and
a piston in said cylinder displaceable therein parallel to said disk axis and engageable with said backing plate to displace said pad against said one of said faces.

4. The brake defined in claim 3 wherein said one of said lobes is further formed with a second pair of flat guide flanks spaced apart in the direction of said pivot axis and extending parallel to said first pair of guide flanks, distal from said pivot means, said brakeshoe in said one lobe being slidable between said second pair of guide flanks.

5. The brake defined in claim 3 wherein said faces are frustoconical.

6. The brake defined in claim 3 wherein both said brakeshoes are removable through said opening.

7. The brake defined in claim 3 wherein said other of said lobes is formed with opposing holding ribs, said other backing plate being snugly received between said holding ribs.

8. The brake defined in claim 3 wherein said actuating means is provided with a relatively narrow strip engaging said one of said brakeshoes, said strip extending substantially parallel to said pivot axis.

9. The brake defined in claim 3 wherein said other of said lobes is formed with a relatively narrow ridge engaging said other backing plate, said ridge extending substantially parallel to said pivot axis.

10. The brake defined in claim 3 wherein said yoke is formed of two sections joined in the vicinity of said brakeshoes, the joint between said sections being offset toward said other of said lobes to an extent sufficient to maintain said corresponding brakeshoe in engagement with said guide flanks upon complete wear of said lining.

References Cited
UNITED STATES PATENTS

| 2,934,174 | 4/1960 | Lucien | 188—73 |
| 3,235,037 | 2/1966 | Peras. | |
| 3,275,105 | 9/1966 | Petit. | |
| 3,331,471 | 7/1967 | Redmayne | 188—73 |
| 3,422,934 | 1/1969 | Hamlding | 188—73 |

FOREIGN PATENTS

| 1,019,094 | 2/1966 | Great Britain. |

GEORGE E. A. HALVOSA, Primary Examiner

U.S. Cl. X.R.

188—250